United States Patent [19]

Hirata et al.

[11] Patent Number: 4,554,556
[45] Date of Patent: Nov. 19, 1985

[54] COLOR PLOTTER

[75] Inventors: Shinichi Hirata, Yamato; Takuro Isayama, Tokyo, both of Japan

[73] Assignee: Ricoh Company, Ltd., Tokyo, Japan

[21] Appl. No.: 489,423

[22] Filed: Apr. 28, 1983

[30] Foreign Application Priority Data

May 11, 1982 [JP] Japan .................................. 57-78773

[51] Int. Cl.[4] ........................ G01D 9/28; G01D 15/18
[52] U.S. Cl. ................................... 346/49; 346/140 R
[58] Field of Search ............. 346/49, 62, 134, 140 PD

[56] References Cited

U.S. PATENT DOCUMENTS

| | | | |
|---|---|---|---|
| 3,840,878 | 10/1974 | Houston et al. | 346/76 PH X |
| 3,949,408 | 4/1976 | Mason et al. | 346/76 PH X |
| 4,046,074 | 9/1977 | Hochberg | 346/135.1 X |
| 4,070,680 | 1/1978 | Shelley et al. | 346/76 PH |
| 4,320,406 | 3/1982 | Heinzl | 346/140 PD |
| 4,405,931 | 9/1983 | Fujisawa | 346/49 X |

Primary Examiner—George H. Miller, Jr.
Attorney, Agent, or Firm—David G. Alexander

[57] ABSTRACT

A color plotter capable of printing out alphanumeric characters and the like at a high speed in addition to color plots is disclosed. A print head assembly comprising ink ejection heads is partly allocated to multicolor plots and partly to single-color characters and controlled to selectively print out graphic data and character data on a sheet as desired. The print head assembly is mounted on a carriage. In a plotter mode, the carriage and sheet are driven each in a reciprocal movement in directions perpendicular to each other with the plot section of the print head assembly energized. In a printer mode, the character section of the print head assembly is energized in response to input pixel data while the carriage is stroking.

10 Claims, 11 Drawing Figures

COLOR PLOTTER

BACKGROUND OF THE INVENTION

The present invention relates to plotters for recording graphic data such as figures in color on a sheet and, more particularly, to one which is capable of recording character data such as alphanumeric characters in combination with graphic data.

A prior art plotter includes a carriage driven in a first direction by a stepping motor amd a platen driven in a second direction perpendicular to the first by another stepping motor. A plurality of ball point pens are carried on the carriage to be movable toward and away from the platen. Each ball point pen is constantly urged toward the platen by a spring but, when out of operation, stopped by a solenoid operated mechanism. To plot graphic data on a sheet which is wound around the platen, at least one of the solenoid operated mechanisms is actuated to bring its associated pen into contact with the sheet and, then, the carriage and/or the platen is driven in the predetermined direction.

A plotter of the type described, however, is inherently slow in writing characters although successful to achieve a desired speed in drawing diagrams. This results from the fact that the carriage and platen are driven with a pen protruded into contact with the sheet, that is, the tip of the pen and the sheet are moved two-dimensionally relative to each other as in handwriting.

Meanwhile, a character printer known in the art has a multidot print head capable of printing out a vertical or horizontal string of pixels at a time out of a dot matrix which constitutes a character. Characters on one line may be printed out successively by one horizontal stroke of a carriage. Although this construction may offer fast printout operations for character data, the operating speed is quite low when it comes to graphic data because the horizontal stroke of the carriage has to be repeated a number of times while moving a platen to feed a sheet. Also, the resulting diagram will lack sufficient continuity in appearance.

SUMMARY OF THE INVENTION

It is an object of the present invention to provide a color plotter which is capable not only of recording color graphic data smoothly at a high speed but of recording character data also at a high speed.

It is another object of the present invention to provide a color plotter which is capable of recording graphic data in a mixture of multiple colors and character data in a single color.

It is another object of the present invention to provide a generally improved color plotter.

A color plotter embodying the present invention includes plotting means for plotting graphic data on a sheet at a spacing therefrom, and a carriage for mounting the plotting means thereon. First drive means drives the carriage in a reciprocal movement in a first predetermined direction, while second drive means drives the sheet in a reciprocal movement in a second predetermined direction which is perpendicular to the first. Control means controls the plotting means, first drive means and second drive means in a predetermined mode in which the graphic data is plotted in a colored pattern on the sheet.

In accordance with the present invention, a color plotter is capable of printing out alphanumeric characters and the like at a high speed in addition to color plots. A print head assembly comprising ink ejection heads is partly allocated to multicolor plots and partly to single-color characters and controlled to selectively print out graphic data and character data on a sheet as desired. The print head assembly is mounted on a carriage. In a plotter mode, the carriage and sheet are driven each in a reciprocal movement in a direction perpendicular to the other with the plot section of the print head assembly energized. In a printer mode, the character section of the print head asembly is energized in response to input pixel data while the carriage is stroking.

Preferably, in the plotter mode, yellow ink, magenta ink and cyan ink are ejected either one after another or at the same time in which case the different colors will be mixed together on a sheet. In the printer mode, the character data may be printed out in a 7×5 or 7×(7, 9, 12 etc.) or like dot matrix by configurating the character section of the print head assembly accordingly.

Desirably, a color plotter control logic and a character print control logic are stored in an electronic control such as a microprocessor system, so that the control logics are selectively effected in response to input data.

Other objects, features and advantages, together with the foregoing, will become apparent from a consideration of the following detailed description taken in conjunction with the accompanying drawings.

BRIEF DESCRIPTION OF THE DRAWINGS

FIG. 2b is an end view of a print head assembly mounted on a carriage of the plotter shown in FIG. 2a;

FIG. 3a is a block diagram of an electronic control system associated with the mechanism shown in FIG. 2a;

FIG. 3c is a flowchart demonstrating a control effected by a microcomputer shown in FIG. 3a over the entire system.

DESCRIPTION OF THE PREFERRED EMBODIMENTS

While the color plotter of the present invention is susceptible of numerous physical embodiments, depending upon the environment and requirements of use, substantial numbers of the herein shown and described embodiments have been made, tested and used, and all have performed in an eminently satisfactory manner.

Figure 1:
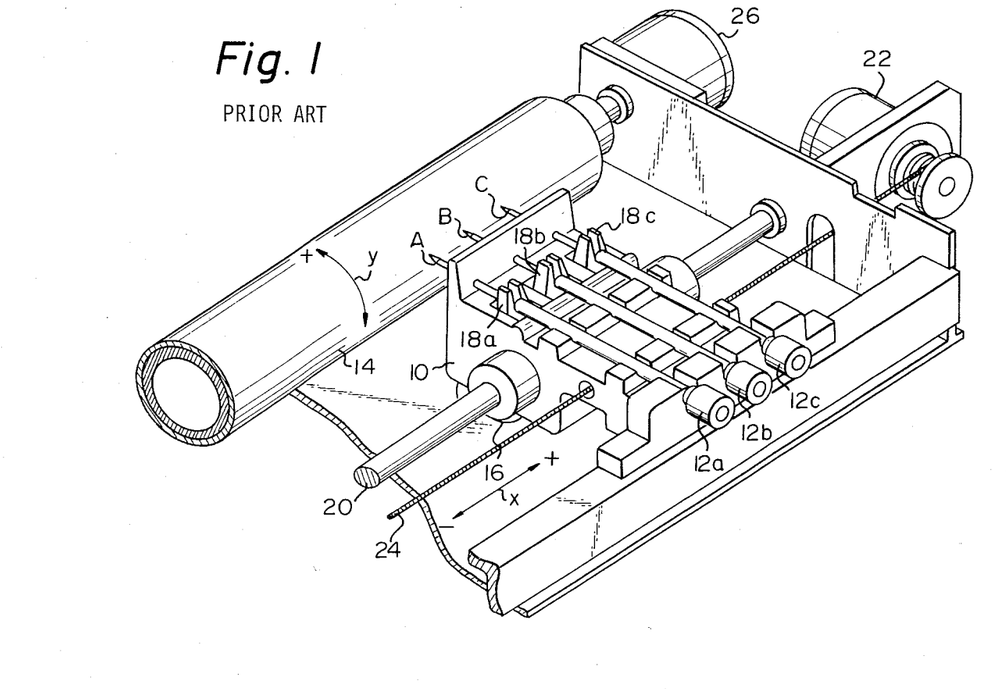
FIG. 1 is a fragmentary perspective view of a prior art color plotter.

To facilitate understanding of the present invention, a brief reference will be made to a prior art color plotter, depicted in FIG. 1. The plotter is of the type having ball point pens A, B and C mounted on a carriage 10. Coil springs (not shown) are individually preloaded in spring retainers 12a–12c so as to constantly bias the ball point pens A–C toward a platen 14. Three solenoids 16 are mounted on the underside of the carriage 10, although only one is visible in the drawing. The plungers of the solenoids 16 are individually connected to stop arms 18a, 18b and 18c which are adapted to normally check the movement of the pens A-C toward the platen 14. As any one of the solenoids 16 is energized, its plunger will be moved against the action of a return spring associated therewith to drive the stop arm 18 toward the platen 14, so that the associated pen is pushed by the coil spring into contact with a sheet of paper (not shown) which is wound around the platen 14. The three solenoids 16 are selectively energized while the carriage 10 is moved in the x-direction and the platen 14 in the y-direction, thereby recording graphic data such as a diagram on the sheet. The carriage 10 is guided by a guide bar 20 to be movable in the x-direction therealong. A stepping motor 22 drives the carriage 10 through a wire 24 and a second stepping motor 26 drives the platen 14.

This type of prior art color plotter, as previously discussed, is inherently slow in writing characters as distinguished from diagrams. Characters have to be recorded by driving the carriage 10 and platen 14 with selected one of the pens A-C protruded to the recording position, that is, by moving the recording tip and sheet two dimensionally or in the x- and y- directions relative to each other in the same manner as handwriting.

Figure 2A:
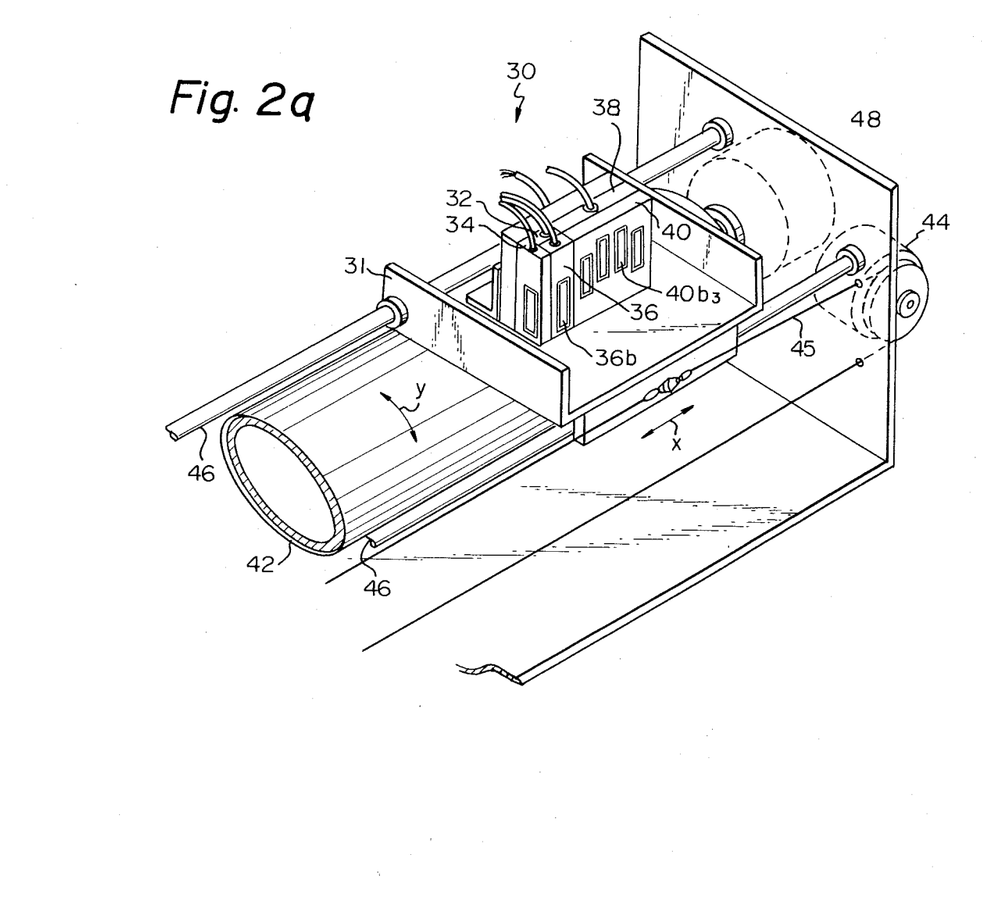
FIG. 2a is a perspective view of a color plotter embodying the present invention.

Referring to FIG. 2a, essential part of a color plotter embodying the present invention is shown. The plotter includes a print head assembly generally designated by the reference numeral 30. The print head assembly 30 is mounted on a carriage 31 and comprises on-demand type ink ejection heads 32, 34, 36, 38 and 40. The heads 32–36 are individually provided with electrostrictive vibrators. The head 38 has three electrostrictive vibrators for printing out linearly aligned three dots. Further, the head 40 has four electrostrictive vibrators for printing out four linearly aligned dots. Ink ejection ports of all the heads 32–40 are directed toward a platen 42 of the plotter as will be described.

Figure 2B:
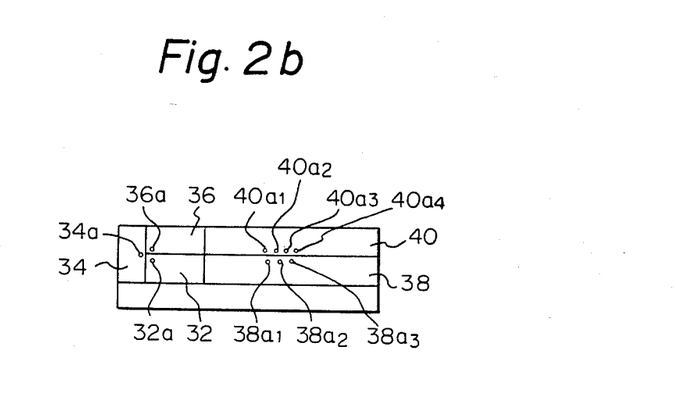
Figure 2C:
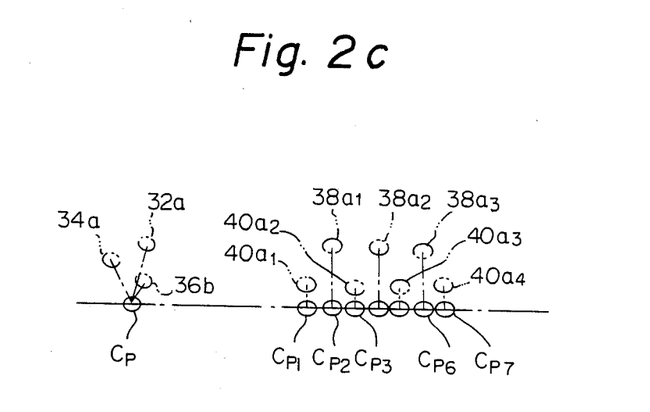
FIG. 2c is a diagram representing a relationship between ink ejection nozzles of the print head assembly and print positions on a sheet.

The end of the print head assembly 30 which faces the platen 42 is illustrated in FIG. 2b. The heads 32–36 are respectively provided with nozzles 32a, 34a and 36a which are spaced from each other as shown in FIG. 2b. However, the axes of the nozzles 32a–36a are inclined such that ink droplets ejected therefrom converge to a common point Cp on a sheet (not shown) wound around the platen 42, as illustrated in FIG. 2c. The head 38 is provided with an array of aligned three nozzles $38a_1$, $38a_2$ and $38a_3$ and the head 40, an array of aligned four nozzles $40a_1$, $40a_2$, $40a_3$ and $40a_4$. Although nozzle arrays 38a and 40a are arranged parallel to each other and each at a spacing of two dot pitch, the axes of the nozzles are individually inclined such that ink droplets ejected therefrom impinge on linearly aligned points $Cp_1$–$Cp_7$ on the sheet at a spacing of one dot pitch.

An ink chamber defined in each of the heads 32–36 is communicated to the associated nozzle 32a–36a. One of the walls defining the ink chamber has therewith an electrostrictive vibrator (as represented by one 36b in FIG. 2a). Cyan ink, magneta ink and yellow ink are respectively supplied to the ink chambers in the heads 32–36. The head 38 has ink chambers individually communicating to the nozzles $38a_1$–$38a_3$ while the head 40 has ink chambers individually communicating to the nozzles $40a_1$–$40a_4$. Again, one of the walls defining each of the ink chambers carries one electrostrictive vibrator (as represented by one $40b_3$ on the head 40). Black ink is fed to all the ink chambers of these heads 38 and 40.

The carriage 31 is driven by a stepping motor 44 through a wire 45 along guide bars 46 in the x-direction, while the platen 42 is driven by a stepping motor 48 about its axis in the direction y.

Figure 3A:
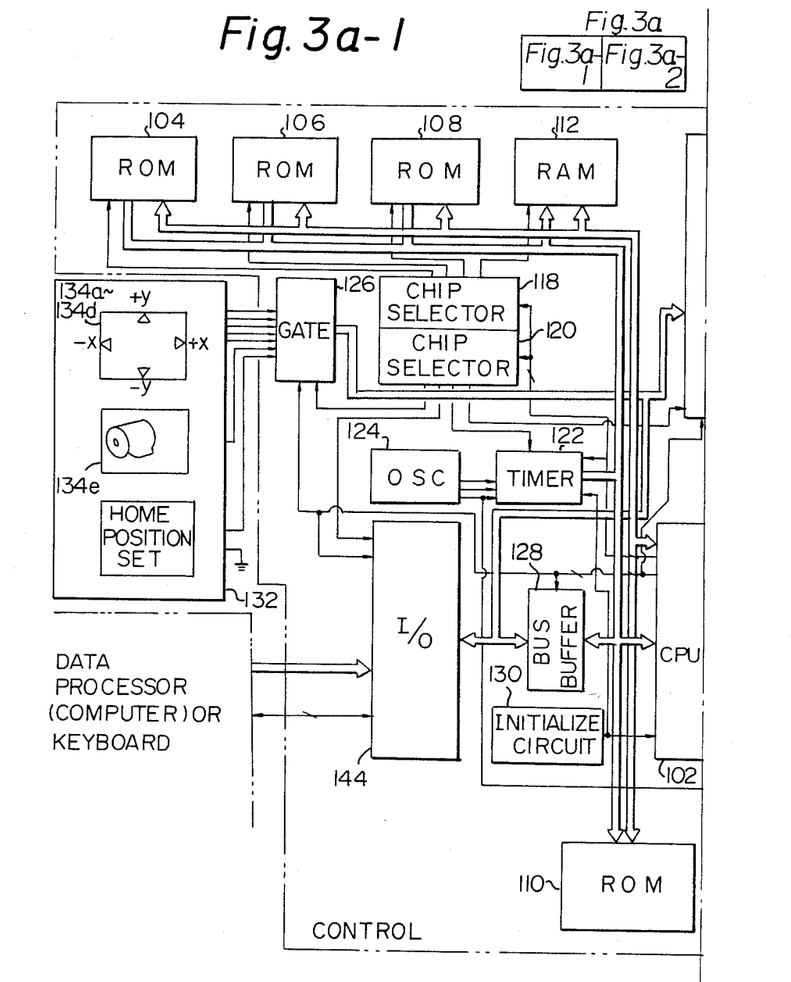
Figure 3A:
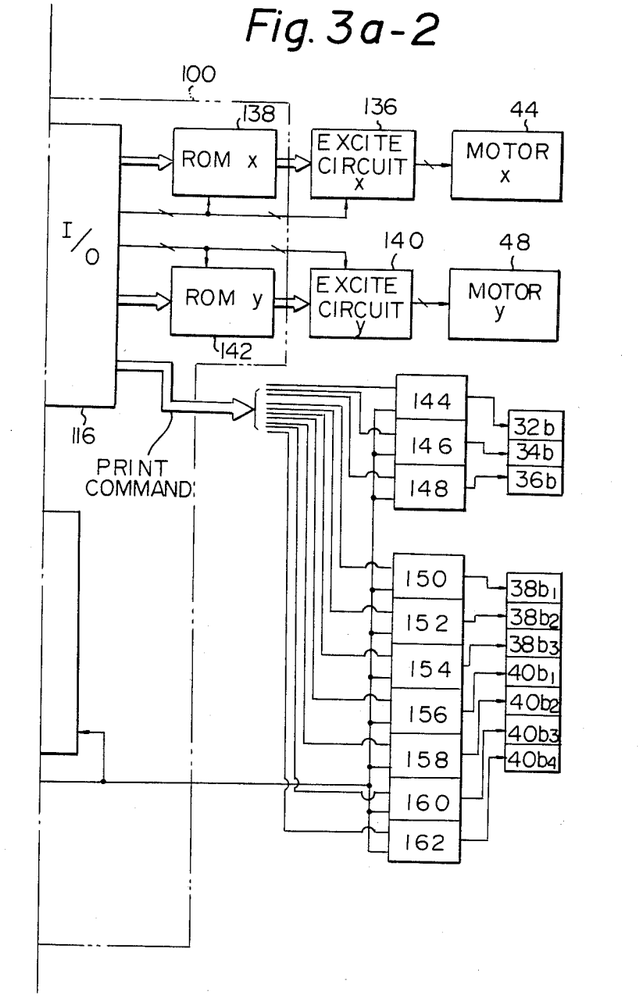

Referring to FIG. 3a, an electronic control circuit associated with the mechanism of FIG. 2a is illustrated and generally designated by the reference numeral 100. The control circuit 100 comprises a microcomputer or microprocessor (CPU) 102, read only memories (ROMs) 104, 106, 108 and 110, a random access memory (RAM) 112, and input/output (I/O) ports 114 and 116. The control circuit 100 also comprises chip selectors 118 and 120, a timer 122, a pulse oscillator 124, a gate 126, a bus buffer amplifier (bidirectional) 128 and an initializing circuit 130. The plotter is controlled by the control circuit 100 to operate either in a plotter mode or in a printer mode which will be described. An operation board 132 is mounted on a control console of the plotter and carries thereon four switches 134a–134d for positioning the carriage 31 in the x-direction and selecting a print position in the y-direction, a sheet feed command switch 134e, and a home position (x-axis at the absolute origin) set command switch 134f. All these switches 134a–134f are connected to the gate 126. The ROM 104 stores read program data for reading statuses of the switches 134a–134f and input data at the I/O port 116, the ROM 106 stores diagram (plotter) record control data, the ROM 108 stores program data for character (printer) record control, and the ROM 110 stores alphanumeric character data as well as other data which may be printed out.

The stepping motor 44 is actuated by an exciting circuit 136 which is connected to a ROM 138. Likewise, the stepping motor 48 is actuated by an exciting circuit 140 which is connected to a ROM 142. Based on the program data stored in the ROMs 104 and 108, the CPU 102 controls the addresses of the ROMs 138 and 142 which then supply their associated exciting circuits 136 and 140 with excite command signals. For so controlling the ROMs 138 and 140, the CPU 102 is aided by an up-down address counter (not shown) which upcounts in response to forward movements ($+x$, $+y$) and downcounts in response to reverse movements ($-x$, $-y$).

Figure 3B:
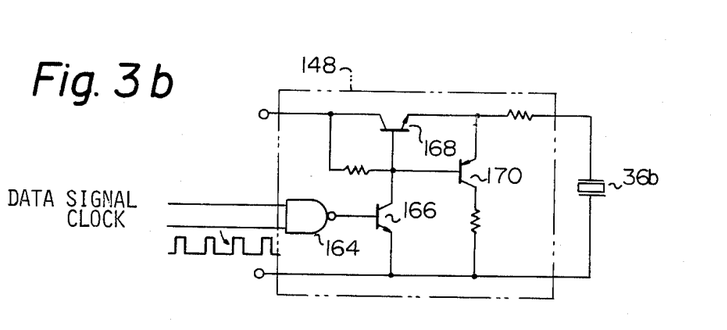
FIG. 3b is a diagram of a vibrator energizing circuit in accordance with the present invention.
Figure 3C:
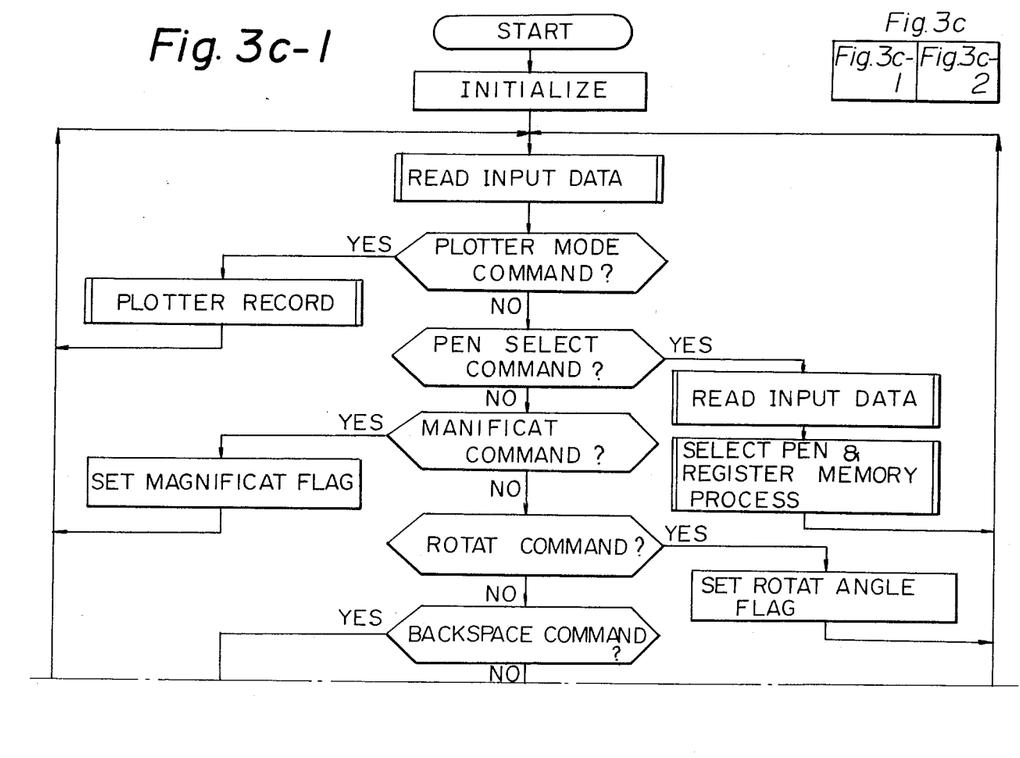
Figure 3C:
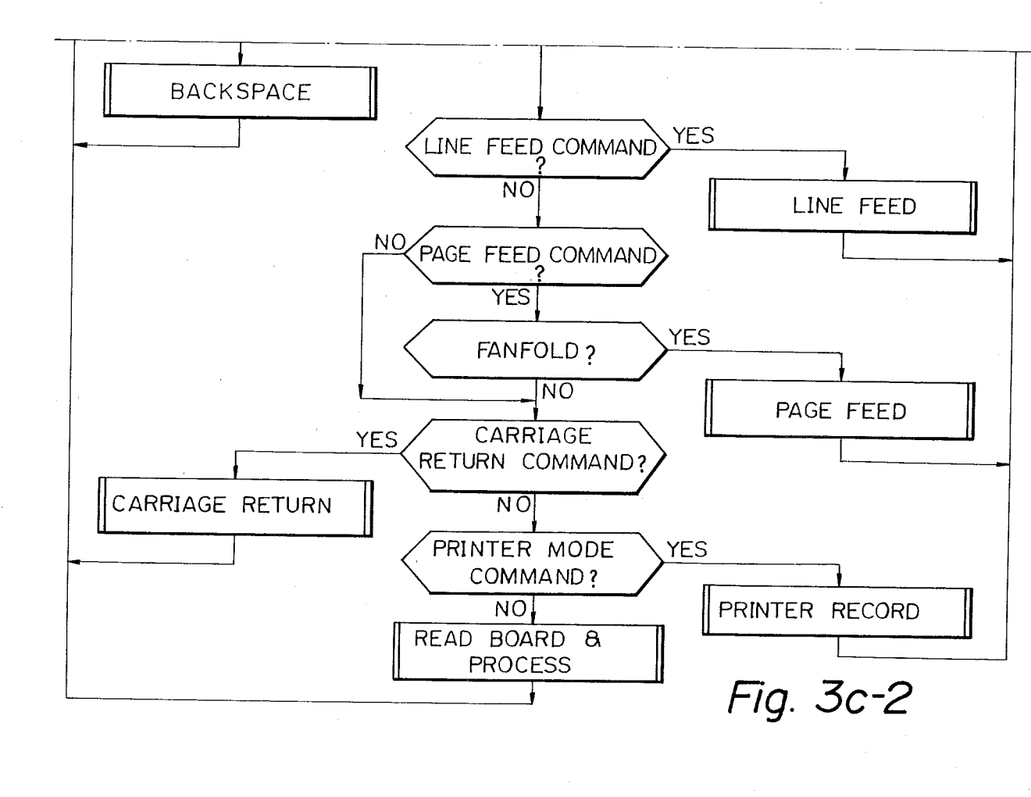

The electrostrictive vibrators $32b$–$36b$, $38b_1$–$38b_3$ and $40b_1$–$40b_4$ on the heads are selectively energized by vibrator energizing circuits 144–162 respectively. All these circuits are identical in construction and, therefore, the following description will concentrate on the circuit 148 by way of example. As shown in FIG. 3b, the circuit 148 includes a NAND gate 164 and transistors 166–170.

While the print signal remains (logical) "0" or non-print level, the output of the NAND gate 164 is "1" level to turn on the transistor 166, turn off the transistor 168 and thereby turn on the transistor 170. In this situation, no voltage for constriction (deformation in a direction for constricting the ink chamber) will be applied to the vibrator 36b. As the data signal becomes "1" level, the NAND gate 164 delivers an inverted version of a clock pulse train so that the transistor 166 is repeatedly turned on and off. When the transistor 166 is off, the transistor 170 is off and the transistor 168 is on whereby a constriction voltage will be applied to the vibrator 36b to cause the nozzle 36a to eject an ink droplet. In detail, when the data signal is made "1" level only for one period of the clock pulses, a single droplet will be ejected from the nozzle 36a. While the data signal remains "1" level, ink droplets will be continuously ejected from the nozzle 36a one per clock pulse period.

Referring to FIG. 3c, an operation control flow is outlined. In the flowchart, "plotter record" represents recording of graphic data while "printer record" represents recording of character data. In the plotter record mode, the I/O port 114 is supplied with coordinates origin data and, following it, color command data, line command data (straight, phantom, arcuate, etc.) and inflection point data in succession. The CPU 102, decoding the color command data, specifies one of the heads 32–36 to be energized, drives the carriage 31 and platen 42 in the (+x, −x) direction and (+y, −y) direction respectively, and commands the specific head to print out graphic data. Here, although the origin of the coordinates for drawing a diagram is confined in the actual recordable range of the pens, the coordinates and thereby the diagram is not limited to the actual recordable range but may even range to several times the width of a sheet. Hence, an arrangement is made such that when a diagram indicated by input data goes beyond the recordable range, only the CPU 102 continues an imaginary print control operation while holding the carriage 31 at a predetermined limit position which defines the recordable range. During this period of time, all the print heads are kept deenergized. As soon as the print position reenters the recordable range, the drive of the carriage is resumed and so is the energization of the print heads.

In response to a printer mode command, the CPU 102 selects a print position ($CP_1$-$CP_7$) of the carriage 31 and a position on the sheet as specified by the input data (x- and y-axes). Thereafter, the CPU 102 reads character data out of the ROM 110 and prints out a character by selectively energizing the heads 38 and 40.

Now, it may be desired to mix the three different colors of ink during printout of multicolor graphic data. While the configuration of the three nozzles 32a–36a shown and described well meets such a demand, it may be replaced by a parallel arrangement of nozzles which sequentially eject different colors of ink toward a common point each at a predetermined delay. Preferably, two arrays of such parallel nozzles are arranged crosswise along the x- and y-directions with the nozzle at the intersection shared by the two arrays. Should the nozzle array extend only in the x-direction, mixed color printout in the y-direction would become inconvenient. This is also true for the arrangement of the nozzles for printing out characters, that is, the orientation of the nozzles in the embodiment shown and described may be convenient in the y-direction but not in the x-direction. Alternative nozzle arrangements designed with this in view are illustrated in FIGS. 4 and 5.

Figure 4:
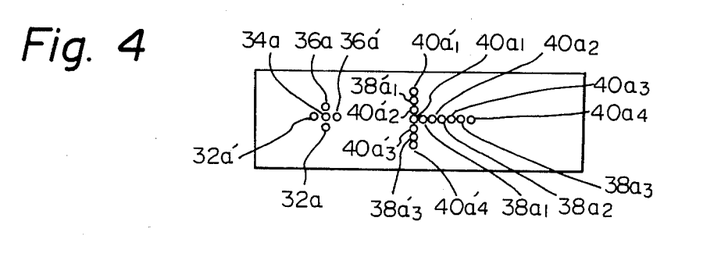
FIGS. 4 and 5 are views of modified nozzle arrangements applicable to the present invention.

In FIG. 4, the nozzles 32a, 34a and 36a for multicolor plotting are arranged in one direction while nozzles 32a' and 36a' are arranged perpendicular thereto sharing the intermediate nozzle 34a. A generally T-shaped arrangement of character print nozzles shown beside the color plotting nozzles comprises an array of nozzles $40a_1$, $38a_1$, $40a_2$, $38a_2$, $40a_3$ and $40a_4$ and an array of nozzles $40a_1'$, $38a_1 40$, $40a_2'$, $40a_3'$ and $40a_4'$ sharing the nozzle $40a_1$ with the first array. The nozzle arrangement shown in FIG. 5 is similar in principle to that of FIG. 4 except for the inclined crosswise positiion of the color plotting nozzles and the crosswise arrays of the character print nozzles. In FIGS. 4 and 5, the nozzle 32a' corresponds to the nozzle 32a and the nozzle 36a' to the nozzle 36a in the colors of ink they eject. Of all the character print nozzles, those designated by the dashed reference numerals are allocated to the x-direction printout operation.

Figure 5:
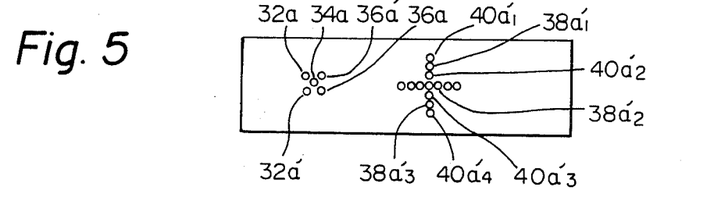

It will be understood that the print head assembly shown in FIGS. 2a-2c may be bodily rotated 90 degrees to achieve the same effect as provided by the nozzle construction of FIGS. 4 or 5.

In summary, it will be seen that the present invention provides a color plotter which can print out both diagrams and characters at a high speed without any increase in the number of required mechanical elements.

Various modifications will become possible for those skilled in the art after receiving the teachings of the present disclosure without departing from the scope thereof.

What is claimed is:

1. A color plotter comprising:
    plotting means for plotting graphic data on a sheet at a spacing therefrom;
    a carriage for mounting said plotting means thereon;
    first drive means for driving said carriage in a reciprocal movement in a first predetermined direction;
    second drive means for driving the sheet in a reciprocal movement in a second predetermined direction which is perpendicular to the first direction;
    control means for controlling the plotting means, the first drive means and the second drive means in a predetermined mode in which the graphic data is plotted in a colored pattern on the sheet; and
    character printing means for printing out character data on the sheet at a spacing therefrom, said character printing means being mounted on the carriage, the control means controlling the plotting means, the first drive means, the second drive means and the character printing means selectively in the first predetermined mode; and in a second predetermined mode in which the character data is printed out on the sheet in a dot matrix;
    the plotting means comprising ink ejection head means for ejecting ink of a plurality of colors each from a nozzle allocated exclusively thereto.

2. A color plotter as claimed in claim 1, in which the axes of the nozzles in the ink ejection head means converge to a common point on the sheet.

3. A color plotter as claimed in claim 1, in which the axes of the nozzles extend parallel to each other in a common plane toward spaced points on the sheet.

4. A color plotter as claimed in claim 1, in which the ink ejection head means comprises an on-demand type ink ejection head.

5. A color plotter comprising:
    plotting means for plotting graphic data on a sheet at a spacing therefrom;
    a carriage for mounting said plotting means thereon;
    first drive means for driving said carriage in a reciprocal movement in a first predetermined direction;
    second drive means for driving the sheet in a reciprocal movement in a second predetermined direction which is perpendicular to the first direction;
    control means for controlling the plotting means, the first drive means and the second drive means in a predetermined mode in which the graphic data is plotted in a colored pattern on the sheet; and
    character printing means for printing out character data on the sheet at a spacing therefrom, said character printing means being mounted on the carriage, the control means controlling the plotting means, the first drive means, the second drive means and the character printing means selectively in the first predetermined mode; and in a second predetermined mode in which the character data is printed out on the sheet in a dot matrix;

the character printing means comprising ink ejection head means for ejecting ink of a same color from a plurality of nozzles thereof.

6. A plotter as claimed in claim 5, in which the axes of the nozzles extend toward points on the sheet which are aligned with each other in a common plane.

7. A color plotter as claimed in claim 5, in which the ink ejection head means comprises an on-demand type ink ejection head.

8. A recording apparatus for plotting graphics and printing characters on a recording medium, comprising:
plotting head means for plotting the graphics;
printing head means for printing the characters;
drive means for integrally moving the plotting head means and the printing head means along perpendicular axes relative to the recording medium; and
control means for discriminating input graphic data from input character data;
the control means controlling the drive means and the plotting head means to plot graphics in response to the input graphic data;
the control means controlling the drive means and the printing head means to print characters in response to the input character data;
the plotting head means and the printing head means comprising ink ejection heads.

9. A recording apparatus for plotting graphics and printing characters on a recording medium, comprising:
plotting head means for plotting the graphics;
printing head means for printing the characters;
drive means for integrally moving the plotting head means and the printing head means along perpendicular axes relative to the recording medium; and
control means for discriminating input graphic data from input character data;
the control means controlling the drive means and the plotting head means to plot graphics in response to the input graphic data;
the control means controlling the drive means and the printing head means to print characters in response to the input character data;
the printing head means comprising a dot matrix ink ejection head.

10. A recording apparatus for plotting graphics and printing characters on a recording medium, comprising:
plotting head means for plotting the graphics;
printing head means for printing the characters;
drive means for integrally moving the plotting head means and the printing head means along perpendicular axes relative to the recording medium; and
control means for discriminating input graphic data from input character data;
the control means controlling the drive means and the plotting head means to plot graphics in response to the input graphic data;
the control means controlling the drive means and the printing head means to print characters in response to the input character data;
the plotting head means comprising a plurality of ink ejection heads for ejecting inks of different colors onto the recording medium in superimposed relation.

* * * * *